United States Patent [19]
Sain et al.

[11] Patent Number: 5,549,787
[45] Date of Patent: Aug. 27, 1996

[54] TREATMENT OF WASTE PRINTED PAPERS WITH SURFACE ACTIVE POLYMERIC COMPOSITIONS TO PRODUCE BRIGHTER PULP

[76] Inventors: Mohini M. Sain, 4259 Savard #2, Trois-Rivières Québec, Canada, G8Y 2J4; Claude Daneault, 3805 Blvd St-Jean, Trois-Rivières-Ouest Québec, Canada, G9A 5E1

[21] Appl. No.: 383,446
[22] Filed: Feb. 3, 1995
[51] Int. Cl.⁶ .................................................. D21C 5/02
[52] U.S. Cl. .................................................. 162/5; 162/4
[58] Field of Search .................................... 162/4, 5, 8

*Primary Examiner*—Donald E. Czaja
*Assistant Examiner*—Dean T. Nguyen

[57] ABSTRACT

This invention relates to a treatment process of wastepaper for making printing grade paper from newsprints and office-wastes using surface active polymer composition including a novel surface active terpolymer. In particular, the invention is concerned with a process for removing ink from an aqueous pulp slurry by treating the pulp with a surface active polymer composing of two to three comonomers in which at least one is a hydrophobe and another is a hydrophil, having a glass transition temperature ranging from about 105° C. to about 170° C., alkali metal salts of the said surface active polymer and the combination of the said surface active polymer with a fatty oil alkoxy derivative or fatty acid soaps.

6 Claims, No Drawings

TREATMENT OF WASTE PRINTED PAPERS WITH SURFACE ACTIVE POLYMERIC COMPOSITIONS TO PRODUCE BRIGHTER PULP

BACKGROUND OF THE INVENTION

Recycling of wastepaper is a key to survival of pulp and paper industries. The driving forces are limited by space for landfills, prevention of forests, and consumer pressure and legislation for recycled content in paper products. To produce good quality recycled paper requires, among other, the removal of ink from wastepapers which is commonly recognized as wastepaper deinking. Various technologies are available for doing this, which essentially consists of two steps: detaching ink from fiber and separating the suspended ink particles from the pulp slurry. For each step a variety of options are open; ink dispersion is usually achieved in the repulping step by the addition of deinking chemicals mostly in an alkaline medium, while ink separation is effected by screening, washing or flotation.

During recent years flexographic printing has been developed beyond the printing of pakaging materials and is an option for newspaper printing. Flexographic inks are water-based, providing printing and environmental benefits, but their presence reduce deinking quality by froth flotation and results in a more difficult effluent classification from washing devices. A very similar problem is encountered for inkjet-printed officewastes. Sales of inkjet printers are increasing rapidly due to more and more use of network computers, electronic mail etc. Pulping of papers printed in Deskjet printer, utilizing a liquid ink system, produces smaller particles than laser printers or photocopiers. In fact, on pulping, the deskjet-printing inks which are essentially dyes dissolved in water and glycols, totally disperse in aqueous repulping medium to produce a uniformly grey stock.

In practice segregation of wastepaper based on the type of printing is impossible. In most cases, wastepapers containing newsprints printed with offset and lithography are contaminated with flexo-printed newsprints. Similarly, office-wastes containing toner based printed papers are contaminated with inkjet-printed officewastes. Although successful deinking technologies by froth flotation are available for offset and lithography printed newsprints, a flexography or inkjet printed paper contamination into other printed paper is causing severe deinking problem for the reason mentioned above.

The present invention simplifies the deinking of flexo- and inkjet-printed papers contaminated wastepaper mixtures using repulping and froth flotation processes by treating a repulped slurry in aqueous medium with a surface active polymer composition in presence or absence of a conventional surfactant to agglomerate small ink particles to a size range suitable for flotation and finally removing those agglomerated inks by creating air bubbles under constant agitation from the said repulped slurry.

SUMMARY OF THE INVENTION

It has been discovered that improved recyclability of wastepapers contaminated with flexography- and inkjet-printed papers is simply obtained by treating the wastepaper pulp, herein designated as repulped slurry, with a limited amount of a surface active polymer compound or a mixture of said compounds. Subjecting printed wastepapers contaminated with paper printed by flexographic and inkjet processes to shear forces under alkaline condition followed by treatment of this repulped secondary fiber slurry in an aqueous medium with a surface active polymer compound or mixture of compounds having a glass transition temperature ranging from 105° C. to 170° C. with or without a conventional surfactant, effects separation of the ink particles in minimum time even at a temperature below 35° C. By surface active polymer compound is meant an organic polymer, more specifically, a copolymer or terpolymer having at least one hydrophobic and one hydrophillic monomers, the polymer being adsorbed by the ink particles thereby facilitates repulsion of ink particles from fiber surface and agglomeration of the free inks. The polymeric compounds are specific compositions with the hydrophobic part being styrene and the hydrophillic part essentially contains an organic acid anhydride of the following structure:

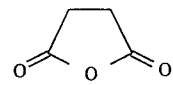

More particularly, this invention deals with styrene-acid anhydride copolymer or terpolymer as a surface active polymer compound for treating repulped-secondary fiber. Henceforth the term surface active polymer compound and surface active polymer composition will be used interchangably to designate a single compound or a mixture of compounds. By terpolymer is meant an organic polymer containing three different monomer units in polymer chain and by treatment of repulped slurry is meant a process which is adopted to incorporate the surface active polymeric composition in an alkaline medium to facilitate separation of inks from secondary fiber. The said polymeric composition is beleived to produce the ink separation effect by agglomerating ink particles, perferably small ink particles of average particle size 10 microns and smaller by two different mechanisms: by charge neutralization of ink binder in an alkaline medium in presence of an aqueous solution of metal halide or by precipitating them in a midly alkaline medium as small solid particles followed by their agglomeration with other ink particles of similar size and preventing them from deposition on the pulp surface and, finally floating them out with controlled air flow and agitation. Regardless of the correct explanation, it is observed that the treatment of the pulp in alkaline medium with said surface active polymeric composition enhances the agglomeration of small ink particles to the size range of about 5 to 200 microns and then removes them from aqueous pulp slurry by froth flotation, thereby completely or partially eliminates a pulp washing stage usually required to remove small inks from repulped newsprints. It is in the aforesaid sense of being enhanced agglomeration and reducing the residual small ink particles below 5 microns in removing inks that deinking the secondary fiber is to be understood herein.

Perferred compositions of surface active polymer are those in which styrene and an organic acid anhydride are essential chemical components in a copolymer, more particularly, the acid anhydrides being 2,5 furandione, 2- dodecenyl succinic anhydride and 2-methylene succinic anhydride.

Preparation of the said surface active polymer wherein the composition is a styrene- 2,5 furandione copolymer is described in the Eur. Pat. No. 27, 274, the disclosure of which is incorporated herein by reference. Novel compounds of surface active polymer in which the polymer being a mixture of a styrene-2,5 furandione copolymer and, a terpolymer of styrene, 2,5 furandione and a third comonomer are prepared by bulk copolymerization of the particular hydrophobe employed with 10 to 40 mole percents 2,5 furandione and 1 to 20 mole percents of a third comonomer chosen from 2-dodecenyl succinic anhydride, citraconic anhydride and 2-methylene succinic anhydride. This preparation may typically be accomplished as follows.

Two to four molar equivalents of styrene is heated with one to three molar equivalents of 2,5 furandione at a temperature ranging from about 60° C. to 90° C. with a catalytic amount of a free radical initiator such as laouryl peroxide, benzoyl peroxide in an inert liquid medium such as toluene, benzene, xylene. These catalysts and diluent systems and their amounts are well known and will not be described in detail. A typical concentration of catalyst and a preferred diluent system of this invention are particularly suitable for ink removal described in U.S. Pat. No. 3,725,360, the teachings of which are incorporated herein by reference. The heating of styrene and 2,5 furandione is continued for 10 to 60 minutes in oxygen free atmosphere in order to initiate the reaction between styrene and 2,5 succinic anhydride, as evidenced by a marginal increase in the viscosity of solution, and then about 0.1 to 1.5 mole equivalents of a third comonomer such as 2-dodecenyl succinic anhydride is added. The reaction may be advantageously carried out at slight pressure, for example, at about 5 pounds per square inch pressure in a glass apparatus. The preferred temperature during the third comonomer addition is above 75° C. Temperature below 75° C. may be used, but the reaction is quite slow. After addition of a third comonomer the reaction is continued for another 1 to 3 hours. When the required extent of reaction is achieved, as determined by the viscosity of solution, the batch is then stripped to remove liquid diluent, the product is recovered first by dissolving in sufficient amount of acetone followed by precipitating it in water. The unique property of these surface active polymers is that they are soluble in alkali.

It should be noted that the said surface active polymer compositions with good ink agglomeration and sufficient frothing character herein disclosed are obtainable only when 2-dodecenyl succinic anhydride is added as a third comonomer during the reaction. No addition of 2-dodecenyl succinic anhydride leads to products which are efficient in ink agglomeration but do not possess sufficient frothing ability to remove most of the agglomerated inks from aqueous pulp slurry. Such copolymers with a third comonomer other than 2-dodecenyl succinic anhydride or without any third comonomer are also suitable for use as ink agglomerating agents in accordance to this invention are styrene-acid anhydride copolymers or terpolymers.

The styrene-acid anhydride copolymer is one having a styrene content at least about 50 mole percents, preferably from about 60 to 80 mole percents and a glass transition temperature in the range from about 105° C. to about 170° C., preferably from about 110° C. to about 160° C. Preferred styrene-acid anhydride copolymers and terpolymers are styrenecitraconic anhydride copolymer, styrene-2,5 furandione-2 methylene succinic anhydride terpolymer, styrene-2,5 furandione-citraconic anhydride terpolymer, styrene-2,5 furandione copolymer, the later being particularly preferred. The styrene-acid anhydride copolymers and terpolymers other than those containing 2-dodecenyl succinic anhydride can be prepared using techniques well known to the art. The preferred systems are alternating and random copolymers as described by Moore in I.E.C. Prod. R.D. on page 315, V-25, 1986 and described as random copolymers on pages 359, 364 and 390, Trivedi and Culbertson, Maleic anhydride, Plenum Press, New York, 1982. See also Czech CS. Pat. No. 247, 037 for preparation of block copolymers.

More particularly this invention comprises the process to incorporate the said surface active polymer composition in a wastepaper repulped-slurry in an aqueous alkaline medium in order to agglomerate free small inks, preferably small inks generated from repulping of flexogarphic newsprints and inkjet-printed officewastes containing waste printed paper mixtures and then separating the agglomerated inks in the size range of about 5 to 200 microns from the pulp slurry by froth flotation.

The treatment of waste printed paper is preceeded by an alkaline repulping step. Repulping of secondary fiber may be effected using any conventional process and apparatus. Typically waste paper is subjected to mechanical shearing in a so called high consistency laboratory pulper. The function of a pulper in waste paper recycling operations is to defiber the paper and detach ink particles from fibers. The pulper produces a high consistency pulp slurry herein designated as "repulped slurry", when waste printed paper is agitated with a high speed rotor in an aqueous alkaline medium. The consistency of repulped slurry typically varies from about 5 to 20 percent and usually from about 7 to 13 percents by weight of paper fiber basis dry weight of waste printed paper relative to the total weight of the slurry. The pH of the aqueous alkaline medium ranges from about 7.5 to about 11.5, more frequently the pH is maintained in the vicinity of about 8.0 to 10.5. Repulping chemicals may be added to the pulper. The reason for adding chemicals to the pulper is to assist in the easy release of the undesirable materials such as ink and stickies, from waste paper and to make these undesirable materials accessible for separation by conventional deinking processes such as screening, flotation and washing. The principal repulping chemicals used in this invention are: sodium hydroxide, sodium silicate, chelating agent and hydrogen peroxide. A typical repulping chemical composition contains 1.0 to 4.0 percent sodium silicate, 0.5 to 2.0 percent hydrogen peroxide, 0.1 to 0.25 percent chelant such as diethylenetriamine-pentaacetic acid (DTPA), sodium hydroxide as required to adjust the pH from 7.5 to 11.5. In some cases dilute hydrochloric acid is also used for pH adjustment depending on the resulting pH of the pulp slurry after addition of all pulping chemicals except sodium hydroxide. The temperature of the pulper is held in the range of about 25° C. to 60° C. A temperature above 60° C. may be used with an undesirable loss in mechanical shear during the repulping process. The time of repulping may be from about 10 to 30 minutes. Usually, a repulping time of about 15 to 25 minutes is advantageous.

In most cases, the repulped slurry contains free ink particles ranging from about 0.1 micron to about 200 microns or more. It has been discovered that the treatment of a diluted repulped slurry with a surface active polymer composition surprisingly improved the agglomeration of small ink particles ranging from about 0.1 micron to about 10 microns. A subsequent flotation of the aforesaid treated slurry in a conventional flotation cell has readily removed the inks from aqueous slurry. Since the invention process is particularly applicable to waste printed paper contaminated with papers printed with flexographic and inkjet processes, such ink removal process may also be applied for flotation deinking of flexo- or inkjet-printed wastepapers alone.

Flotation of the repulped fiber may be effected using any conventional process and apparatus. Typically repulped slurry from pulper is treated in a flotation cell under controlled agitation and air flow. The choise of an agitator, an agitator speed and an air flow rate are well known art and will not be discussed here in detail. The pulp consistency in the flotation cell may be varied from about 0.2 percent to about 1.2 percent of dry pulp in relation to the total weight of slurry. More preferred pulp consistency is from about 0.3 percent to about 0.8 percent by weight. Treating the low consistency pulp with an aqueous medium containing a surface active polymer composition may be conveniently effected in a flotation cell by simply adding the surface active polymer composition to the repulped slurry. The pH of the fiber slurry may range from about 7.5 to about 10.5. More preferred pH range is from about 8.0 to about 9.5. The pH can be adjusted by addition of an acid or a base as required.

All alkali soluble copolymers and terpolymers herein described as surface active polymer compunds may be incorporated in the flotation cell as their alkali metal salts more preferably as their sodium salts. In their anionic form, an aqueous solution of metal chloride is also added to the pulp slurry together with the surface active polymer composition. Generally, calcium chloride, potassium chloride and magnesium chloride are used as metal chlorides but calcium chloride dihydrate is preferred.

The amount of the said surface active polymer composition used typically ranges from about 0.3 percent to about 2.5 percent and usually about 0.5 percent to about 2.0 percent on dry basis weight of waste printed paper in repulped slurry. The amount of metal chloride is usually about the same as the said surface active polymer composition.

Another suitable method to introduce the said surface active polymer compositions which are insoluble in aqueous alkaline solution having a pH less than 10.5, in an aqueous pulp slurry in a flotation cell is in the form of a water-based dispersion. A water-based dispersion of a surface active polymer composition may be prepared by first dissolving the solid polymer in a water insoluble organic solvent in a concentration range of about 3 percent to about 8 percent by weight of the solvent and then dispersing this polymeric solution in water. The organic solvents which are suitable for this application are esters and ethers, more particularly phthalate and adipate type esters such as dioctyl phthalate, dibutyl adipate. The water is the domimant phase in the aqueous dispersion of the said polymeric solution. Preferred ratio is 40 parts of polymeric solution to 60 parts of water by weight. Water based dispersion may be suitably made by stirring the mixture at high speed with a propeller in presence of a small amount of a dispersant. A sodium salt of benzene napthyl sulfonate in the concentration range of about 0.05 to 0.1 percent of dispersion may be used as a dispersant. It should be noted that the use of this water based dispersion is limited to an aqueous pulp slurry having pH less than about 10.5.

Because removing the ink particles as much as possible is most desirable in the deinking of repulped secondary fibers, an important feature of secondary pulp recycling is agglomeration of small ink particles having particle size below 5 microns. In general, water-based dispersion of surface active polymer composition may be employed for agglomerating small inks in practicing the present invention. The water-based dispersion is believed to produce the aforesaid effect by precipitating the dispersed surface active polymer as solid particles of small sizes on their introduction to an aqueous pulp slurry having pH about 10 or less and once precipitates promoting agglomeration of free small ink particles.

The introduction of a surface active polymer composition in the form of a water-based dispersion in flotation cell improves deinking for repulped secondary fiber, more preferably for repulped fiber containing xerography, laser printed papers and old newsprints (ONP). The function of a water insoluble solvent is beleived to be the swelling of ink-fiber interface of fused large ink particles and breaking them to small particles suitable for agglomeration and flotation. The amount of water-based dispersion typically ranges from about 0.1 percent to about 2.0 percent by weight of surface active polymer composition based on dry basis weight of pulp in aqueous slurry.

Of course, the aqueous slurry in flotation cell may contain other additives commonly used in flotation deinking operation. Examples of such are chelating agents, frothers, conventional deinking agents, defomers etc. Nonionic or anionic deinking agents may be employed together with water-based dispersion in the practice of this invention. Because of the low foaming nature of these solid surface active polymeric particles in pulp slurry, usually a frothing agent is used to float out the agglomerated ink particles from aqueous medium. Examples of satisfactory frothing agents include those materials described as 'polyalkylene oxide block copolymers' on pages 300–37 1, Schick, Nonionic Surfactants,Marcel Dekker, Inc., New York, 1966. See also JP. Pat. No. 05, 51 887. Conventional fatty acid soaps and other nonionic surfactants may also be used as frothing agents.

Using surfactant to provide sufficient foaming ability is a well known art and surfactant compositions of secondary fiber recyclates provide a wide selection from which to choose a frothing agent for practicing the present invention. Usually the amount of frothing agents is small and typically ranges from about 0.01 percent to about 0.1 percent by weight based on dry pulp for nonionic type frothing agents and ranges from about 0.1 percent to about 0.5 percent by weight on dry pulp for fatty acid soap type frothers. A chelating agent may be introduced in the pulp slurry immediately after flotation process. The amount of chelating agent may range from about 0.1 percent to about 2.0 percent of the dry basis weight of pulp.

The alkaline salts and the water-based dispersions of surface active polymeric composition disclosed in this invention may be used for deinking of waste papers printed by lithography, offset, flexography processes and office wastes processed by xerography, laserjet and deskjet printers. More preferentially, alkaline metal salts of said surface active polymer compositions may be used to deink waste printed papers contaminated with significant amount of flexo and inkjet printed papers and the water- based dispersions can be more suitably used for mixture of officewastes and old newsprints (ONP) including flexo printed newsprints. The officewastes in this invention include xerography, laser and inkjet printed papers.

DESCRIPTION OF THE PREFERRED EMBODIMENTS

As illustrative of deinked waste printed-paper composition comprising of both newsprints and officewastes, waste-papers with two separate compositions were repulped in a laboratory high consistency pulper. About 920 grams of waste printed papers were torn into about 3-inch squares and charged in a laboratory pulper containing appropriate amount of warm water to adjust the required consistency. The repulping was carried out in alkaline medium of pH 10.5 by adding 2.0 percent sodium silicate, 3.0 percent hydrogen peroxide, 0.1 percent chelant-diethylenetriaminepentaacetic acid and sodium hydroxide in required quantity to adjust the pH. In these embodiments and embodiments hereafter, all weights and concentrations are based on weight percent of dry basis weight of paper unless otherwise specified. The repulping was carried out by mixing the composition in the pulper for about 20 minutes with a rotor speed of about 1500 revolutions per minute. The temperature of the pulp slurry was about 45° C. These two repulped compositions before treatment with surface active polymer composition of styrene-acid anhydride copolymer or terpolymer in a flotation cell are designated as 'H-1 and H-2 Repulped Stocks' as in given below.

| H-1 and H-2 REPULPED STOCKS | | |
| --- | --- | --- |
| | Repulped stock | |
| | H-1 (wt. %) | H-2 (wt. %) |
| OLD NEWSPRINT | | |
| Flexographic | 30 | 30 |
| Offset | 70 | 40 |
| OFFICEWASTE | | |
| HP-laserjet | NIL | 10 |
| HP-deskjet | NIL | 10 |
| Photocopy | NIL | 10 |

The wastepapers used in these examples of repulped stocks are old newsprints printed by offset and water-based flexographic processes. The officewastes used in these examples were 21.6 cm×27.9 cm sheets printed on one side with uniform alfabetic text generated by HP-laserjet and HP-deskjet printers. The laserjet printed text was photocopied on one side of a white paper of same size using SAVIN 7500 copier employing a toner. The pulp consistencies in the repulped stocks were 8 percent and 13 percent for H-1 and H-2 repulped stocks respectively.

EXAMPLE I

The H-1 and H-2 repulped stocks are made into handsheets by passing through a Handsheet machine according to TAPPI test method T-272-om-92 and through a Buchner funnel according to TAPPI method T-218-om-92. These two methods were used to justify the effect of small ink particles on deinking. It is already understood that TAPPI method T-218-om-92 is more suitable for brightness measurement of stocks containing large amount of small ink particles wherein a filter paper of 2.5 microns pore size was used in the present invention to make handsheets. On the other hand, the handsheets making in accordance with TAPPI method T-272-om-92 was performed using a 140 mesh screen. The handsheets made according to Tappi methods T-218-om-92 and T-272-om-92 from control repulped stock H-1 had average brightnesses of 39-40% ISO and 42-43% ISO respectively determined in accordance with the Technical Association of Pulp and Paper Industry (TAPPI) method T-217. The H-2 repulped control handsheets made according to Tappi test method T-272-om-92 had an average brightness of 54% ISO determined in accordance with TAPPI method T-217 and an average ink particles surface area of 0.0174 meter square per meter square of paper as determined by an image analyzer 'Ultimage version 2.1' coupled with an optical microscope, Carl Zeiss, Germany and determined on handsheets with 60 grams per meter square basis weight.

EXAMPLE II

This example illustrates the preparation of styrene-2,5 furandione- 2, dodecenyl anhydride terpolymer composition followed by deinking of repulped stocks H-1 and H-2 as described in Example I with this prepared surface active polymer composition in accordance with one embodiment of the treatment of this invention.

One hundred and four parts of approximately 1 molar equivalent of a commercial grade freshly distilled styrene, was charged in a flask equipped with a stirring system. About 1600 milliliters of benzene and thirty seven parts of commercial grade 2,5-furandione was added in the flask and the total charge was heated at 60° C. for 10 minutes to dissolve all 2,5-furandione. Then about 0.85 part by weight of freshly crystallized benzoyl peroxide was added to the flask in an oxygen free atmosphere and a positive pressure of about 5 pounds per square inch was maintained in the flask. The temperature of the mixture was raised to about 75° C. and held for about 1 hour until the reaction between styrene and 2,5-furandione started as evident by an increase in the turbidity of the solution. Twenty parts of approximately 0.1 molar equivalent of a commercial grade 2-dodecenyl succinic anhydride was added to the mixture. Reaction was carried out for another 90 minutes maintaining the mixture temperature in the range of 75 to 80° C. The batch was then cooled to 60° C., benzene was stripped off and polymer was precipitated from acetone solution by adding water. The aforesaid synthesized product, a mixture of terpolymer of styrene-2,5 furandione-2 dodecenyl succinic anhydride having a glass transition temperature of about 137° C. and a copolymer of styrene-2,5 furandione having glass transition temperature of about 160° C., herein designated as 'terpolymer composition' was used to deink repulped stocks H-1 and H-2 . The sodium salt of this terpolymer composition was made by dissolving the product in aqueous sodium hydroxide solution.

A number of flotation experiments were made using varying consistency of repulped slurries H-1 and H-2 (1). The treatment of varing weight percent of prepared sodium salt of terpolymer composition (2) with repulped slurries was made in a laboratory open-Top Leeds cell type flotation cell. With minor differences, the treatment procedure used in each experiment was as follows.

Varying repulped slurry consistencies from about 0.3 to 1.0 percent by weight of dry pulp was made by diluting the stock H-1 and H-2 as described in Example I by adding required amount of warm water with constant stirring and then adjusting the pH of the diluted pulp slurry to a given pH (3). The pH of pulp slurry was varied from about 8.0 to about 10.0. Varying amounts of the said terpolymer composition were added in the form of a sodium salt to provide from 0.1 to 2.0 percent by weight of terpolymer composition based on dry pulp together with an aqueous solution of calcium chloride of about equal amount to terpolymer composition by weight of calcium chloride. The temperature of the slurry was adjusted from about 30° C. to about 60° C. (5). This pulp slurry containing the said terpolymer composition was then treated by mixing at high speed of about 1200 revolutions per minute for about 1 to 5 minutes (4). This treatment period is designated herein as 'conditioning period'.

Air was introduced in the flotation cell to remove agglomerated inks after conditioning of repulped slurry. The air flow rate was about 3000 milliliters per minute. Flotation was carried out for about 10 minutes and then air flow was stopped. About 0.3 percent of chelant-diethylenetriaminepentaacetic acid by weight of dry pulp was added to the flotation cell and slurry was agitated for another one minute. The pH of the resulting deinked pulp slurry was then adjusted to 8.5 and slurry is made into handsheets by passing through a Handsheet machine according to TAPPI test method T-272-om-92 and through a Buchner funnel according to TAPPI method T-218-om-92 as described in Example I. The brightness of the handsheets were determined in accordance with the TAPPI method and residual ink surface area was determined by image analysis mentioned in Example I. The Table I summarizes the results of seven experiments. It is evident that a brightness gain of about 8 points is achieved.

EXAMPLE III

This example, illustrates treatment of repulped stocks H-1 and H-2 of Example I in accordance with another embodiment of this invention, using a surface active polymer composition having a glass transition temperature of about 162° C. comprises of sodium salt of styrene-2,5 furandione copolymer prepared by solubilizing 50 parts of the said copolymer in 1200 milliliters of 0.5 molal sodium hydroxide. The solubilization was carried out under constant stirring for 3 hours at about 45° C. Treatment of repulped stocks and then flotation of agglomerated inks were carried out in a similar fashion as described in Example II, except that a sodium salt of styrene-2,5 furandione copolymer was used for pulp treatment instead of a terpolymer composition. Varying amounts of sodium salt of styrene-2,5 furandione copolymer together with an aqueous solution of calcium chloride of about equal amount of the copolymer composition by weight of calcium chloride was added in the pulp slurry in flotation cell. The % ISO brightness and ink surface area of deinked pulp are given in Table II. A marked improvement in % ISO brightness and a decrease in the ink surface area is evident after treatment.

EXAMPLE IV

As illustrative of another embodiment, a surface active polymer composition containing an anionic frothing agent was prepared by heating 50 parts by weight of styrene- 2,5 furandione copolymer having glass transition temperature of about 128° C. with 10 parts of by weight of sodium oleate in 1200 milliliters of 0.5 molar sodium hydroxide solution under constant stirring. The mixing was carried out for about 3 hours at a temperature of about 45° C. Six series of experiments were made using this alkaline solution of surface active polymer composition for treating the repulped stocks H-1 and H-2 of Example I with varying pulp consistency and then florating out the agglomerated inks from the slurry by repeating the procedure of Example II. The amount of the aforesaid alkaline solution of surface active polymer composition added to the repulped stocks contained 1.6 weight percent by weight of styrene-2,5 furandione copolymer on dry basis weight of pulp in the slurry. An aqueous solution of calcium chloride containing 2.0 percent by weight of calcium chloride on dry basis weight of pulp in the slurry was also added to the pulp slurry before conditioning period. The pH of the slurry was adjusted to about 8.5 in each experiment and the pulp slurry temperature was about 45° C. for all experiments. A flotation time of about 10 minutes was used for all experiments. Handsheets made from deinked pulps after flotation of treated repulped stocks H-1 and H-2 had brightness values and ink surface areas as shown in Table III.

The data shows that the treated repulped-secondary fiber has improved brightness even with a smaller concentration of styrene-2,5 furandione copolymer in a short conditioning time.

EXAMPLE V

In still another embodiment, a surface active polymer composition containing a nonionic frothing agent was prepared by heating 100 parts of styrene-2,5 furandione copolymer having a glass transition temperature of about 128° C. with 2.5 parts of DI 600 (product of Kao Corp.) in 1200 milliliters of 1 molal sodium hydroxide solution under constant stirring. The mixing was carried out for about 3 hours at a temperature of about 55° C. Four runs were made using this alkaline solution of surface active polymer composition for treating the repulped stocks H-1 and H-2 of Example I and then flotating the agglomerated inks by repeating the procedure of Example II. The amount of the aforesaid alkaline solution of surface active polymer composition added to the repulped stocks contained 1.6 weight percent by weight of styrene-2,5 furandione copolymer on dry basis weight of pulp in the slurry. An aqueous solution of calcium chloride containing 2.0 percent by weight of calcium chloride on dry basis weight of waste printed paper in pulp slurry was also added to the flotation cell before conditioning period. The pH of the slurry was adjusted to about 8.5 in each experiment and the pulp slurry temperature was about 45° C. for all experiments. A flotation time of about 10 minutes was used in each set of experimental run. Handsheets made from deinked pulps after flotation of treated repulped stocks H-1 and H-2 had brightness values and ink surface areas as shown in Table IV. A recycled fiber with ISO brightness of about 54% had been obtained for newsprints contaminated with about 30% by weight of flexo-printed newspaper.

EXAMPLE VI

The following illustrate embodiments of the invention in which a surface active polymer, styrene-2,5 furandione copolymer having a glass transition temperature 147° C. had been treated with the repulped stocks H-2 as in Example I in a flotation cell in the form of a water-based dispersion.

The water-based dispersion of the aforesaid copolymer was prepared by dissolving 80 parts of the copolymer in 1000 milliliters of dioctyl phthalate. The dissolution had been carried out at about 60° C. under constant stirring for about 6 hours. Fourty parts of this polymer solution was then dispersed in 60 parts of water by high speed mixing of the composition with a propeller. About 0.01 part of sodium salt of dodecylbezenesulfonic acid by 100 parts of the copolymer was added as a dispersant.

Treatment of the repulped H-2 stock as described in Example I had been carried out in a flotation cell by adding a varying amount of the said water-based dispersion at about 60 ° C. to the repulped slurry with a varying pulp consistency and then mixing the slurry for about 15 minutes. About 1.0 percent by weight of sodium oleate by weight of dry pulp and about same amount of calcium chloride in the form of an aqueous solution had been added to the pulp slurry. The pH of the repulped slurry was adjusted to about 8.5 and the slurry was conditioned for about 2 minutes and then flotation of the agglomerated ink particles were carried out in the same fashion as described in Example II. Results of the brightness values of the handsheets made from deinked pulp and the ink surface areas on the handsheets are summarized in Table V. The present treatment process, which by comparative evaluation with other standard treatment process known to the prior art, serve to prove the superiority of our novel pulp treatment process. Thus, in a separate treatment process a conventional ink collector system known to the prior art, comprises of about 1 percent by weight of sodium oleate and 1 percent by weight of calcium chloride in the form of an aqueous solution, had been used to treat repulped stock H-2 in a similar fashion as described above without any addition of a water-based dispersion of styrene-2,5 furandione copolymer. The resulting brightness value and ink particle surface area of this standard treatment process is also given in Table V for comparison only and is outside the teachings of the present invention.

In Table V, data illustrates clearly the relative superiority of our novel treatment process of repulped slurry with water-based dispersion of ester solution of styrene-2,5 furandione copolymer with regard to its improved brightness and decreased surface area of the ink particles. All the treatment processes involving water-based dispersion, namely, experiments Nos. E1 and E2, are in accordance with present invention are herein defined and claimed.

All of these treatment processes, it will be noted, are acceptable when measured against the standards described in Example I and experiment no. E3 of Example V.

TABLE I

| Exp. series | Stock | 1 | 2 | 3 | 4 | 5 | 6 | 7 | 8 |
|---|---|---|---|---|---|---|---|---|---|
| A1 | H-1 | 0.3 | 1.5 | 8.5 | 1 | 30 | 50.4 | 51.1 | — |
| A2 | H-1 | 0.5 | 1.0 | 10 | 2 | 45 | 46.9 | 48.5 | — |
| A3 | H-1 | 1.0 | 0.1 | 8.5 | 5 | 60 | 42.7 | 45.4 | — |
| A4 | H-1 | 0.5 | 2.0 | 8.5 | 2 | 45 | 49.7 | 52.2 | — |
| A5 | H-2 | 0.3 | 2.0 | 8.0 | 2 | 45 | — | 63.5 | 0.0032 |
| A6 | H-2 | 0.5 | 1.0 | 10 | 2 | 45 | — | 59.7 | 0.0045 |
| A7 | H-2 | 1.0 | 1.5 | 8.0 | 5 | 60 | — | 58.2 | 0.0092 |

1 is the consistency of repured slurry in wt. % of dry waste printed paper,
2 is the wt. % of terpolymer composition based on dry waste printed paper,
3 is the pH of the repulped slurry in flotation cell,
4 is the conditioning time,
5 is the temperature of repuled slurry in flotation cell,
6 is the brightness of the handsheet in % ISO (TAPPI method T-218),
7 Is the brightness of the handsheet in % ISO (TAPPI method T-272) and
8 is the ink surface area on the handsheet in $M^2/M^2$ of paper.

TABLE II

| Exp.* series | Stock | 1 | 2 | 3 | 4 | 5 | 6 | 7 | 8 |
|---|---|---|---|---|---|---|---|---|---|
| B1 | H-1 | 0.3 | 2.0 | 8.5 | 1 | 45 | 48.4 | 50.3 | — |
| B2 | H-1 | 0.5 | 0.8 | 10 | 2 | 45 | 45.7 | 48.1 | — |
| B3 | H-1 | 1.0 | 1.5 | 8.5 | 5 | 60 | 44.2 | 46.6 | — |
| B4 | H-2 | 0.3 | 2.0 | 8.0 | 2 | 45 | — | 61.7 | 0.0032 |
| B5 | H-2 | 0.5 | 1.0 | 10 | 2 | 45 | — | 58.3 | 0.0049 |
| B6 | H-2 | 1.0 | 0.5 | 8.0 | 5 | 60 | — | 56.1 | 0.0131 |

*all number abbreviations are the same as in Table I.

TABLE III

| Exp. series* | Stocks | 1 | 4 | 6 | 7 | 8 |
|---|---|---|---|---|---|---|
| C1 | H-1 | 0.3 | 1 | 52.3 | 53.9 | — |
| C2 | H-1 | 0.5 | 1.5 | 48.6 | 51.3 | — |
| C3 | H-1 | 1.0 | 2 | 44.8 | 48.1 | — |
| C4 | | | | | | |
| C5 | H-2 | 0.3 | 1 | — | 63.8 | 0.0029 |
| C6 | H-2 | 0.5 | 2 | — | 61.9 | 0.0041 |
| C7 | H-2 | 1.0 | 3 | — | 58.7 | 0.0046 |

*all number abbreviations are the same as in Table I.

TAaLE IV

| Exp. series* | Stocks | 1 | 4 | 6 | 7 | 8 |
|---|---|---|---|---|---|---|
| D1 | H-1 | 0.3 | 2 | 52.3 | 54.3 | — |
| D2 | H-1 | 0.8 | 3 | 46.6 | 50.1 | — |
| D5 | H-2 | 0.3 | 2 | — | 63.4 | 0.0031 |
| D6 | H-2 | 0.8 | 3 | — | 59.4 | 0.0046 |

*all abbreviations are the same as in Table I.

TABLE V

| Exp. series* | Treatment | 1 | 4 | 6 | 7 |
|---|---|---|---|---|---|
| E1 | Dispersion | 0.5 | 2 | 60.2 | 0.0043 |
| E2 | Dispersion | 1.0 | 5 | 59.6 | 0.0045 |
| E3 | Sodium oleate | 0.5 | 2 | 56.7 | 0.0125 |

*all number abbreviations are the same as in Table I.

Although the invention has been illustrated by typical examples, it is not limited thereto. Changes and modifications of the examples, of the invention herein chosen for the purposes of disclosure can be made which do not constitute departure from file spirit and scope of the invention.

The embodiments of the invention are in which an exclusive treatment of repulped waste printed paper with surface active polymer compositions to improve recyclability, is claimed and defined as follows:

1. A wastepaper treatment process for producing brighter pulp from an aqueous repulped wastepaper slurry containing offset, photocopy, laser and inkier printed papers contaminated with water-based flexographic ink printed furnish, which process comprises:

(i) mixing said aqueous repulped printed paper slurry containing released small ink particles and dirts with a surface active polymer solution wherein the polymer is adsorbable to small ink particles and dirt, and the surface active polymer in said repulped slurry is between 0.i to 3% by weight of dry waste paper; wherein the surface active polymer solution is art aqueous alkaline solution or a nonaqueous oily phase of a styrene-acid anhydride copolymer or a terpolymer, wherein the terpolymer contain about 60–80 mole percent of styrone, 10–40 mole percent of 2,5 furandione and 1–20 mole percent of a third monomer chosen from the group consisting of 2-dodecenyl succinic anhydride, succinic anhydride, citraconic anhydride and 2-methylene succinic anhydride, wherein the copolymer and terpolymer have a glass transition temperature in the range 105° to 170° C.;

(ii) agglomerating the free small ink particles and dirts from said repulped slurry by agitating at a consistency range between 0.2 to 1.5% and at a temperature between 25° to 75° C. for a time between 1 to 10 minutes to produce agglomerated inks and dirts, said aqueous repulped paper slurry having a pH range between about 7 to 12 and subsequently;

(iii) separating said agglomerated inks and dirts from the resulting aqueous repulped paper slurry by flotation to produce a pulp with high brightness.

2. The treatment of claim 1 wherein mixtures of newsprints and officewaste comprise offset and flexographic ink-printed old newsprint as well as xerography-, laserjet- and inkjet-printed officewaste.

3. The treatment process for waste paper according to claim 1 wherein an aqueous solution of calcium chloride is introduced together with the aqueous alkaline solution of said surface active polymer.

4. The treatment process of claim 1 wherein the nonaqueous oil phase of the surface active polymer solution is dioctyl phthalate.

5. The treatment process of claim 1 wherein said surface active polymer solution is completely dispersed in said aqueous repulped slurry.

6. The treatment of claim 1 in which a frothing agent is used to stabilize the froth during flotation.

* * * * *